US012595171B2

(12) United States Patent
Raynel

(10) Patent No.: US 12,595,171 B2
(45) Date of Patent: Apr. 7, 2026

(54) CO-PRODUCTION OF HYDROGEN AND SULFURIC ACID BY PARTIAL OXIDATION OF SULFUR

(71) Applicant: Saudi Arabian Oil Company, Dhahran (SA)

(72) Inventor: Guillaume Robert Jean-Francois Raynel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 852 days.

(21) Appl. No.: 17/946,145

(22) Filed: Sep. 16, 2022

(65) Prior Publication Data

US 2024/0092635 A1 Mar. 21, 2024

(51) Int. Cl.
| | |
|---|---|
| *C01B 3/06* | (2006.01) |
| *C01B 3/52* | (2006.01) |
| *C01B 17/775* | (2006.01) |
| *C01B 17/98* | (2006.01) |

(52) U.S. Cl.
CPC .............. *C01B 3/068* (2013.01); *C01B 3/52* (2013.01); *C01B 17/775* (2013.01); *C01B 17/98* (2013.01); *C01B 2203/0255* (2013.01); *C01B 2203/0415* (2013.01); *C01B 2203/0485* (2013.01); *C01B 2203/06* (2013.01); *C01B 2203/0827* (2013.01); *C01B 2203/1258* (2013.01); *C01B 2203/148* (2013.01); *C01B 2203/80* (2013.01)

(58) Field of Classification Search
None
See application file for complete search history.

(56) References Cited

U.S. PATENT DOCUMENTS

| | | | |
|---|---|---|---|
| 2,979,384 | A | 4/1961 | Weiner et al. |
| 4,302,434 | A | 11/1981 | Hellmer et al. |
| 4,826,670 | A | 5/1989 | Hegarty |
| 5,501,981 | A | 3/1996 | Ray et al. |
| 5,843,395 | A | 12/1998 | Wang |
| 6,352,680 | B1 | 3/2002 | Watson et al. |
| 9,242,859 | B2 | 1/2016 | Molinari et al. |
| 2010/0230296 | A1 | 9/2010 | Northrop |

(Continued)

FOREIGN PATENT DOCUMENTS

| | | |
|---|---|---|
| EP | 0195447 | 10/1989 |
| EP | 1142628 | 10/2001 |

(Continued)

OTHER PUBLICATIONS

Lopez et al., "Evaluation of NF membranes as treatment technology of acid mine drainage: metals and sulfate removal," Desalination, Aug. 2018, 440:122-134.

(Continued)

*Primary Examiner* — Yun Qian

(74) *Attorney, Agent, or Firm* — Dinsmore & Shohl LLP

(57) ABSTRACT

A system and method for producing hydrogen, including converting sulfur vapor and oxygen gas in a first zone of furnace into sulfur monoxide, injecting water into a second zone of the furnace, converting the sulfur monoxide and the water in the second zone into hydrogen gas and sulfur dioxide, discharging furnace exhaust gas (including the hydrogen gas) from the furnace, condensing sulfur vapor in the furnace exhaust gas into liquid sulfur in a condenser (heat exchanger) downstream of the furnace, and discharging the liquid sulfur from the condenser to a vessel.

7 Claims, 6 Drawing Sheets

Sulfur combustion $$O_2 + S \rightleftharpoons SO_2$$

Sulfur partial combustion $$O_2 + 2S \rightleftharpoons 2SO$$

Sulfur mono-oxide water-gas shift reaction $$H_2O + SO \rightleftharpoons H_2 + SO_2$$

- - - - - - - - - - - - - - - - - - - - - -

Disproportionation of Sulfur mono-oxide $$2SO \rightleftharpoons S + SO_2$$

(56) References Cited

U.S. PATENT DOCUMENTS

| | | | |
|---|---|---|---|
| 2012/0118010 A1 | 5/2012 | Forsyth et al. |
| 2022/0062818 A1 | 3/2022 | Choi et al. |
| 2022/0177306 A1 | 6/2022 | Thellefsen et al. |
| 2022/0199908 A1 | 6/2022 | Maier-Flaig et al. |

FOREIGN PATENT DOCUMENTS

| | | |
|---|---|---|
| EP | 1186334 | 3/2002 |
| WO | WO 2020225060 | 11/2020 |
| WO | WO 2020225063 | 11/2020 |

OTHER PUBLICATIONS

Ricci et al., "Assessment of nanofiltration and reverse osmosis potentialities to recover metals, sulfuric acid, and recycle water from acid gold mining effluent," Water Science & Technology, Apr. 2016, 74(2):367-374.

Tanninen et al., "Long-term acid resistance and selectivity of NF membranes in very acidic conditions," Journal of Membrane Science, Sep. 2004, 240(1-2):11-18.

Webbook.nist.gov [online], "National Institute of Standards and Technology (NIST): P.J. Linstrom and W.G. Mallard, Eds., NIST Chemistry WebBook, NIST Standard Reference Database No. 69," National Institute of Standards and Technology, Gaithersburg MD, 20899, retrieved from URL <https://doi.org/10.18434/T4D303>, retrieved on Feb. 24, 2023.

Zaman et al., "Production of hydrogen and sulfur from hydrogen sulfide," Fuel Processing Technology, Jan. 1995, 41(2):159-198.

International Search Report and Written Opinion in International Appln. No. PCT/US2023/032732, mailed on Jan. 25, 2024, 17 pages.

Sulfur combustion $$O_2 + S \rightleftharpoons SO_2$$

Sulfur partial combustion $$O_2 + 2 S \rightleftharpoons 2 SO$$

Sulfur mono-oxide water-gas shift reaction $$H_2O + SO \rightleftharpoons H_2 + SO_2$$

- - - - - - - - - - - - - - - - - - - - - - - - - - - -

Disproportionation of Sulfur mono-oxide $$2 SO \rightleftharpoons S + SO_2$$

FIG. 1

HSt: $\quad 3\,O_2 + 2\,H_2S \rightleftharpoons 2\,H_2O + 2\,SO_2$

HSp: $\quad O_2 + H_2S \rightleftharpoons H_2O + SO_2$

St: $\quad O_2 + S_{Vap} \rightleftharpoons SO_2$

Sp: $\quad O_2 + 2\,S_{Vap} \rightleftharpoons 2\,SO$

SLt: $\quad O_2 + S_{Liq} \rightleftharpoons SO_2$

SLp: $\quad O_2 + 2\,S_{Liq} \rightleftharpoons 2\,SO$

AntiDisP: $\quad S_{Vap} + SO_2 \rightleftharpoons 2\,SO$

SS Rx: $\quad H_2O + SO \rightleftharpoons H_2 + SO_2$

FIG. 3

$$2\,H_2O + O_2 + 2\,S_{Vap} \rightleftharpoons 2\,H_2 + 2\,SO_2$$

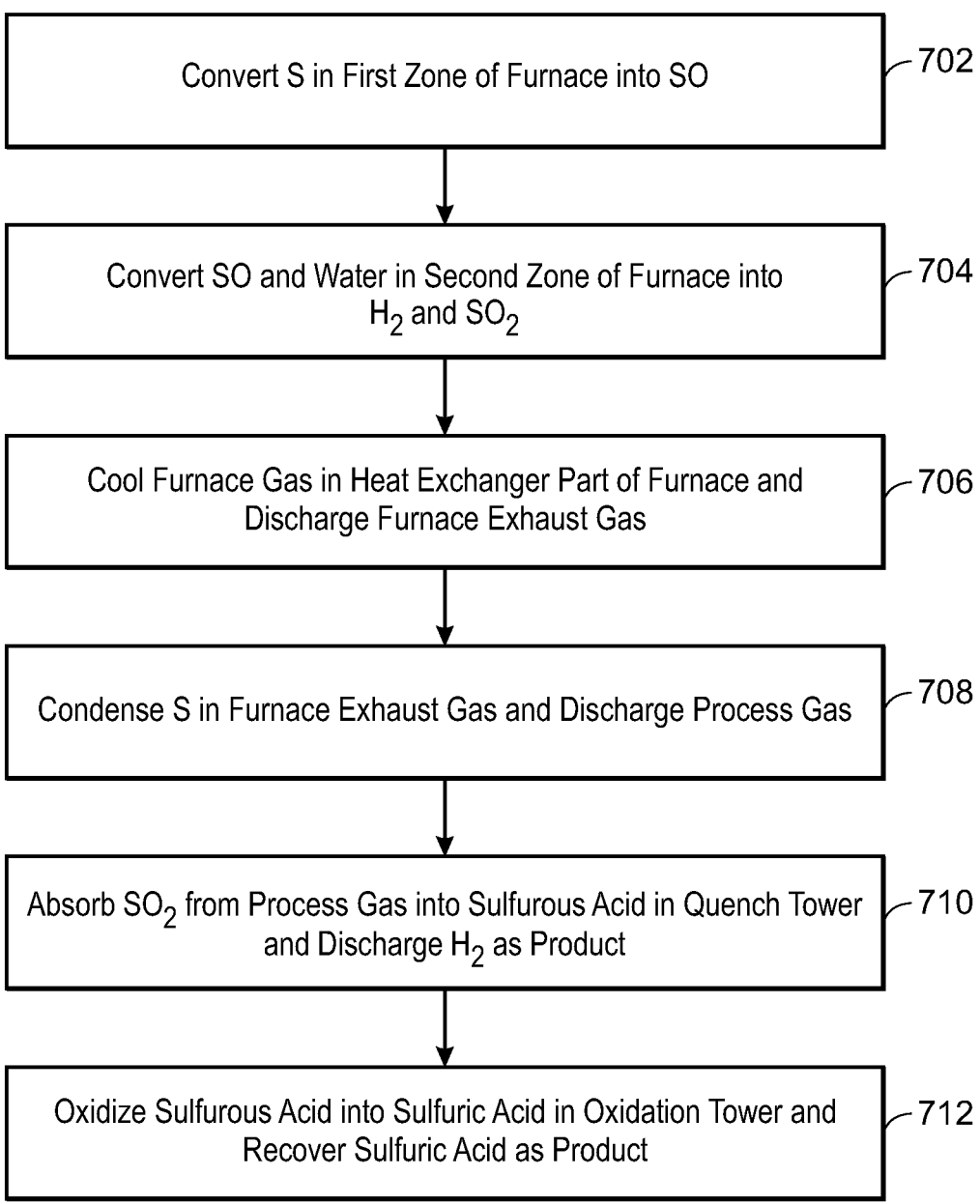

702 — Convert S in First Zone of Furnace into SO

704 — Convert SO and Water in Second Zone of Furnace into $H_2$ and $SO_2$

706 — Cool Furnace Gas in Heat Exchanger Part of Furnace and Discharge Furnace Exhaust Gas 708 — Condense S in Furnace Exhaust Gas and Discharge Process Gas 710 — Absorb $SO_2$ from Process Gas into Sulfurous Acid in Quench Tower and Discharge $H_2$ as Product 712 — Oxidize Sulfurous Acid into Sulfuric Acid in Oxidation Tower and Recover Sulfuric Acid as Product

CO-PRODUCTION OF HYDROGEN AND SULFURIC ACID BY PARTIAL OXIDATION OF SULFUR

TECHNICAL FIELD

This disclosure relates to partial oxidation of elemental sulfur in a furnace to generate hydrogen gas as product.

BACKGROUND

Hydrogen sulfide can be a byproduct of processing natural gas and refining sulfur-containing crude oils. Other industrial sources of hydrogen sulfide may include pulp and paper manufacturing, chemical production, waste disposal, and so forth. In certain instances, hydrogen sulfide can be considered a precursor to elemental sulfur.

Sulfur recovery may refer to conversion of hydrogen sulfide ($H_2S$) to elemental sulfur, such as in a sulfur recovery unit (SRU), e.g., Claus system. The most prevalent technique of sulfur recovery is the Claus system, which may be labeled as the Claus process, Claus plant, Claus unit, and the like. The Claus system includes a thermal reactor (e.g., a furnace) and multiple catalytic reactors to convert $H_2S$ into elemental sulfur that is removed (recovered).

Hydrogen is commercially produced, such as from fossil fuels. Hydrogen may be produced, for example, through reforming of hydrocarbons or electrolysis of water. Hydrogen is produced by coal gasification, biomass gasification, water electrolysis, or the reforming or partial oxidation of natural gas or other hydrocarbons.

The reforming of natural gas is the most prevalent source of hydrogen production. Bulk hydrogen is typically produced by the steam reforming of natural gas (methane). Conventional steam reforming includes heating the natural gas (e.g., to between 700° C. to 1100° C.) in the presence of steam and a nickel catalyst. This endothermic reaction generates carbon monoxide and hydrogen. The carbon monoxide gas can be subjected to a water-gas shift reaction to obtain additional hydrogen.

The produced hydrogen can be a feedstock to chemical processes, such as ammonia production, aromatization, hydrodesulfurization, and the hydrogenation or hydrocracking of hydrocarbons. The produced hydrogen can be a feedstock to electrochemical processes, such as fuel cells.

SUMMARY

An aspect relates to a method of producing hydrogen, including converting sulfur vapor and oxygen gas in a first zone of furnace into sulfur monoxide, injecting water into a second zone of the furnace, converting the sulfur monoxide and the water in the second zone into hydrogen gas and sulfur dioxide, and discharging furnace exhaust gas from the furnace, the furnace exhaust gas including the hydrogen gas and the sulfur dioxide. The method includes condensing sulfur vapor in the furnace exhaust gas into liquid sulfur in a condenser (heat exchanger) downstream of the furnace, discharging the liquid sulfur from the condenser to a vessel, and discharging a process gas from the condenser to a quench tower, the process gas including the hydrogen gas and the sulfur dioxide. The method includes absorbing the sulfur dioxide from the process gas into sulfurous acid in the quench tower, and discharging from the quench tower the hydrogen gas from the process gas.

Another aspect relates to a method of producing hydrogen, including converting sulfur vapor and oxygen gas in a first zone of furnace into sulfur monoxide, converting the sulfur monoxide and water in a second zone of the furnace into hydrogen gas and sulfur dioxide, wherein the water is injected into the second zone. The method includes cooling furnace gas from the second zone in a heat exchanger part of the furnace with liquid sulfur as cooling medium, vaporizing the liquid sulfur in the heat exchanger part into sulfur vapor provided to the first zone, and discharging furnace exhaust gas from the furnace, the furnace exhaust gas including the hydrogen gas and the sulfur dioxide. The method includes condensing sulfur vapor in the furnace exhaust gas into liquid sulfur in a condenser (heat exchanger) downstream of the furnace, and discharging the liquid sulfur from the condenser to a vessel.

Yet another aspect relates to hydrogen production system including a furnace to convert sulfur vapor and oxygen gas in a first zone of the furnace into sulfur monoxide, receive water as injected into a second zone of the furnace, and convert the sulfur monoxide and the water in the second zone into hydrogen gas and sulfur dioxide. The hydrogen production system includes a condenser heat exchanger to receive furnace exhaust gas from the furnace, condense sulfur vapor in the furnace exhaust gas into liquid sulfur and discharge the liquid sulfur to a vessel, and discharge a process gas having hydrogen gas and sulfur dioxide to a quench tower. The hydrogen production system includes the quench tower to absorb sulfur dioxide from the process gas into sulfurous acid and discharge hydrogen gas.

The details of one or more implementations are set forth in the accompanying drawings and the description below. Other features and advantages will be apparent from the description and drawings, and from the claims.

BRIEF DESCRIPTION OF DRAWINGS

FIG. 1 is a diagram of a list of reactions associated with sulfur combustion and other reactions in a furnace.

FIG. 3 is a diagram of a list of considered reactions.

FIG. 5 is a diagram of an overall reaction in a furnace to consumes sulfur vapor and water to generate $H_2$ and $SO_2$.

FIG. 7 is a block flow diagram of a method of producing hydrogen gas, and that may additionally include producing sulfuric acid as co-product.

DETAILED DESCRIPTION

Figure 2:
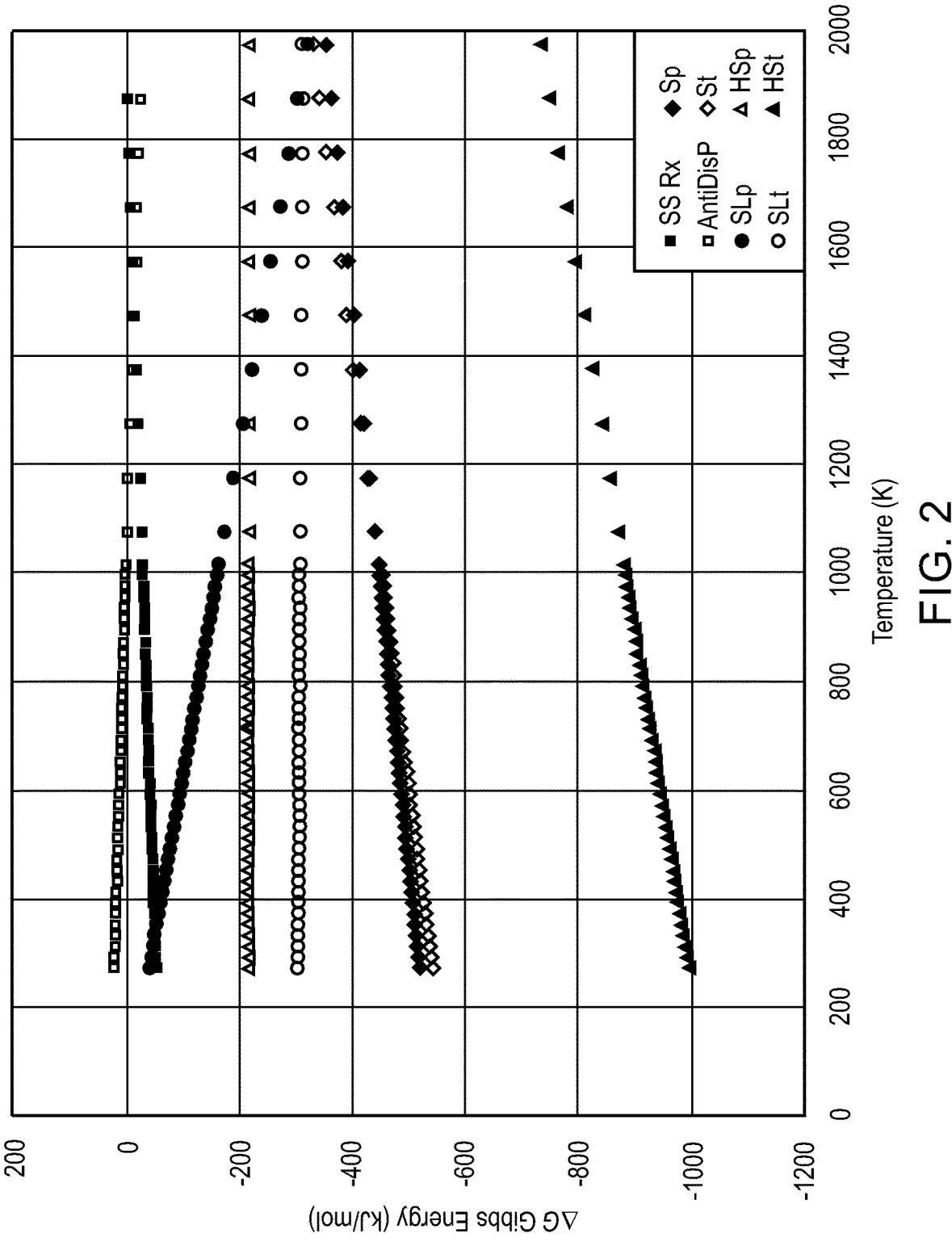
FIG. 2 is a plot of the change in Gibbs free energy as a function of temperature.

Aspects of the present disclosure are directed to producing hydrogen ($H_2$) and sulfuric acid ($H_2SO_4$) from sulfur (S). In particular, in a furnace, sulfur monoxide (SO) is formed from the partial combustion (partial oxidation) of elemental sulfur vapor, and the SO contacted with water ($H_2O$) at a temperature (e.g., in range of 802° C. to 1608° C.) that favors the water-gas shift of SO into sulfur dioxide ($SO_2$) and disfavors the disproportionation of SO. The overall reaction produces $H_2$ and $SO_2$, both discharged in the furnace exhaust gas. The $H_2$ (an $H_2$-rich gas) may be separated from the $SO_2$ by quenching the exhaust gas with cooled acidic water that absorbs the $SO_2$, leaving the $H_2$-rich gas for recovery. The water with absorbed $SO_2$ as sulfurous acid is oxidized into sulfuric acid in an oxidation tower utilizing oxygen from air introduced into the oxidation tower. The dilute sulfuric acid in water exits the oxidation tower. The dilute sulfuric acid is routed to a water treatment unit(s), such as reverse osmosis (RO), electrodialysis, and/or distillation, to concentrate and recover the sulfuric acid. The clean water separated from the dilute sulfuric acid in concentrating the sulfuric acid may be utilized as water fed to the furnace for the furnace water-gas shift reaction that generates $H_2$. The sulfuric acid as concentrated can be monetized or injected in the furnace to enrich the combustion in oxygen and $SO_2$.

Produced $H_2$ can be utilized in the transportation and energy sector, as well as a feedstock to chemical processes, and the like. Embodiments herein can provide $H_2$ for these uses (and other uses) by the partial oxidation (partial combustion) of elemental S vapor to give SO, and water-gas shift of the SO into $H_2$ and $SO_2$. This generation of $H_2$ may occur at a sulfur recovery plant or sulfur recovery unit (SRU) in certain implementations. Moreover, the furnace for performing the partial oxidation and water-gas shift can be a Claus-type furnace.

As background, reactions for the production of hydrogen in a conventional Claus reaction furnace considered include:

Partial methane ($CH_4$) combustion followed by water-gas shift reaction of carbon monoxide (CO) into $H_2$ and carbon dioxide ($CO_2$):

$$3O_2 + 2CH_4 \rightleftharpoons 4H_2O + 2CO$$

$$H_2O + CO \rightleftharpoons H_2 + CO_2$$

Methane steam reforming (with water-gas shift of CO):

$$2H_2O + CH_4 \rightleftharpoons 4H_2 + CO_2$$

The methane steam reforming gives CO. The water-gas shift of CO gives $CO_2$.

Partial hydrogen sulfide ($H_2S$) combustion followed by water-gas shift reaction of SO:

$$O_2 + H_2S \rightleftharpoons H_2O + SO$$

$$H_2O + SO \rightleftharpoons H_2 + SO_2$$

Although the partial combustion of hydrogen sulfide is thermodynamically allowed at operation temperatures less than 2000° K, maintaining the product SO of the partial combustion may be difficult with the potential of the SO oxidizing (combusting) readily further into $SO_2$. This fact is mainly due to the high energetic gain of the system when $H_2S$ is fully oxidized to $SO_2$.

To overcome this challenge, embodiments of the present techniques provide for the partial combustion of S vapor employed in a specific range of temperature in which desired reactions (including partial combustion of S) are favored. The partial combustion of sulfur vapor will preferably form the desired SO. Then, a water-gas shift reaction of the SO occurs to produce the desired $H_2$, as discussed with respect to FIG. 1.

Moreover, as discussed below, the operating temperature of the furnace (sulfur burner) for the partial combustion of S vapor (and for the water-gas shift reaction of the SO) may be, for example in the ranges of 802° C. to 1608° C., 1100° C. to 1350° C., 1150° C. to 1300° C., or 1180° C. to 1280° C., such as at about 1233° C.

FIG. 1 depicts reactions associated with sulfur combustion that may be performed in a furnace (sulfur burner), such as a Claus-type furnace, in the generation of $H_2$. Depicted are the sulfur (sulfur vapor) combustion, sulfur (sulfur vapor) partial combustion, and sulfur monoxide water-gas shift reaction. The disproportionation of sulfur monoxide back into S and $SO_2$ may be an identified side reaction. To appreciate the potential disruptive effect of this side reaction, the change in Gibbs free energy of reactions (in FIG. 3) are calculated as a function of temperature utilizing the enthalpy and entropy of formation given by the National Institute of Standards and Technology (NIST). See P. J. Linstrom and W. G. Mallard, Eds., NIST Chemistry WebBook, NIST Standard Reference Database Number 69, National Institute of Standards and Technology, Gaithersburg MD, 20899, https://doi.org/10.18434/T4D303, (retrieved May 2022). The results are represented in FIG. 2.

FIG. 2 is a plot of $\Delta G$ (the change in Gibbs free energy) in kilojoules per mole (kJ/mol) as a function of temperature in Kelvin (K). Data for each reaction depicted in FIG. 3 are plotted in FIG. 2. This FIG. 2 plot (graph) indicates if the reaction at a given temperature is an equilibrium or not an equilibrium ($0 \neq \Delta G \forall T$), and if going forward ($0 < \Delta G$ and $\rightleftharpoons$), or backward ($0 > \Delta G$ and $\rightleftharpoons$), where $\Delta G$ is change in Gibbs free energy, T is temperature in Kelvin, and $\forall$ is the mathematical symbol for "For all . . . " Again, FIG. 2 is the change in Gibbs energy (Gibbs free energy) of considered reactions as a function of temperature.

FIG. 3 is a list of considered reactions. Elemental sulfur vapor is denoted as $S_{Vap}$. Elemental liquid sulfur is denoted as $S_{Liq}$. HSt is the total combustion of $H_2S$. HSp is the partial combustion of $H_2S$. St is total combustion of elemental sulfur vapor. Sp is partial combustion of elemental sulfur vapor. SLt is the total combustion of elemental liquid sulfur. SLp is the partial combustion of elemental liquid sulfur. AntiDisP is anti-disproportionation of SO. SS Rx is the water-gas shift reaction of SO.

The partial combustion of sulfur vapor and the total combustion of sulfur vapor have similar Gibbs energy. Therefore, these two reactions may generally occur in an equiprobable fashion. The equilibriums can be further driven by adding an excess of sulfur vapor. The addition of excess sulfur vapor may be adequate to shift the reaction to a partial combustion of sulfur vapor (instead of full combustion of the sulfur vapor), and therefore produce preferably the desired SO (instead of $SO_2$) in the combustion. The SO as being formed may be converted almost immediately into $SO_2$ (and $H_2$) via the water-gas shift reaction. SO can be a very reactive species. Disulfur dioxide ($S_2O_2$) may be an unstable intermediate in the disproportionation of SO.

The SO can be produced (via partial combustion of S vapor) over a relatively large range of temperature of 445° C. (718° K) to 1727° C. (2000° K) in the furnace. However, the competing reaction of disproportionation of SO consumes SO at temperatures below 1075° K. To overcome this, the operating temperature of the furnace may be specified at greater than 1075° K. Moreover, the SO water-gas shift reaction is reversed at a temperature above 1881° K. Therefore, the operating temperature may be specified at below 1881° K. Thus, the operating temperature in the furnace may be specified, for example, in the range of 1075° K to 1881° K.

As discussed below, the operating temperature of the furnace (sulfur burner) for the furnace first zone and furnace second zone may be in the ranges, for example, including 802° C. to 1608° C., 1100° C. to 1350° C., 1150° C. to 1300° C., or 1180° C. to 1280° C., such as at a particular value of about 1233° C.

As indicated in FIGS. 1 and 3, the total combustion of elemental sulfur vapor may be the conversion of the sulfur vapor and oxygen gas into sulfur dioxide, and the partial combustion of sulfur vapor may be defined as the conversion of sulfur vapor and a sub-stoichiometric amount oxygen gas into sulfur monoxide.

Figure 4:
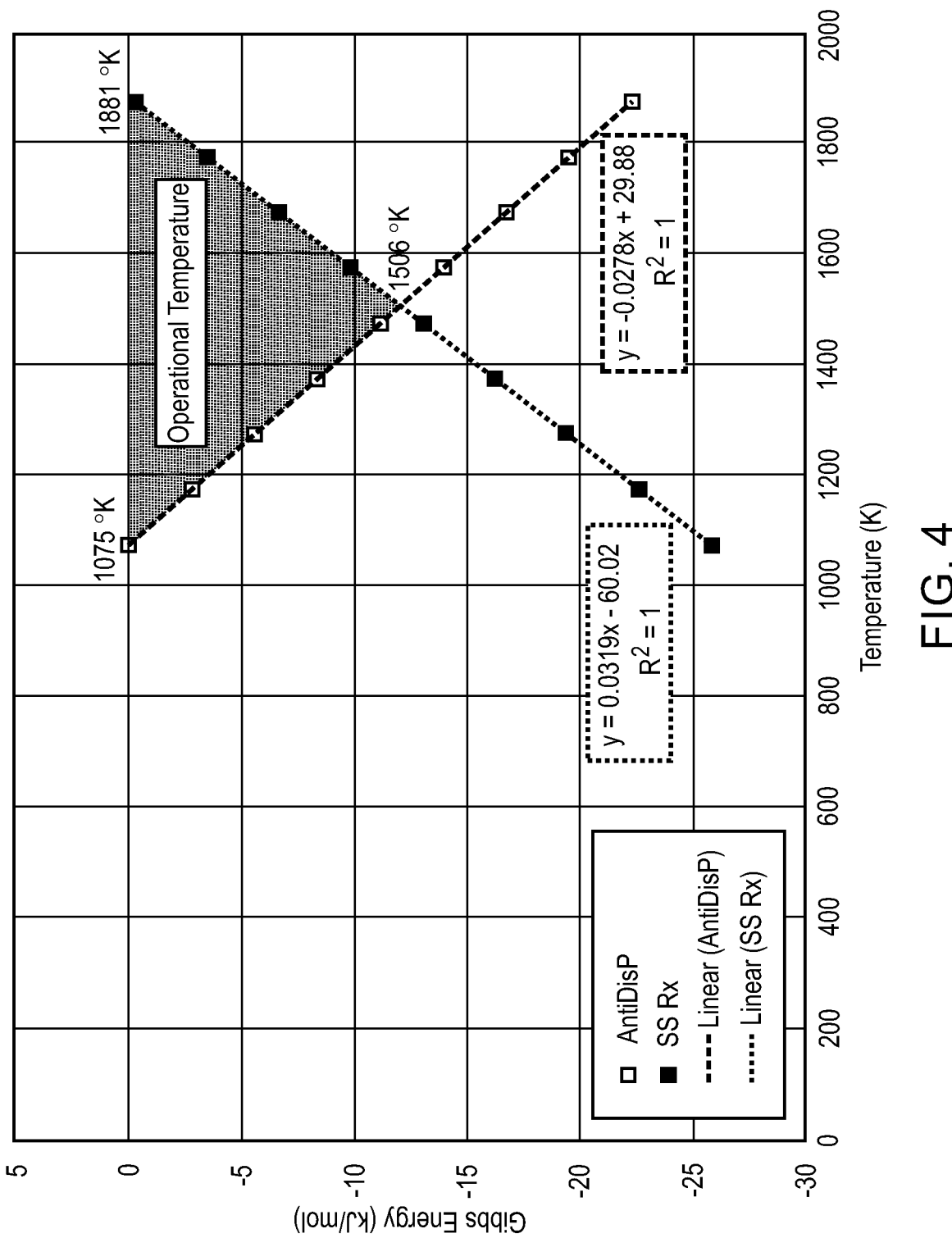
FIG. 4 is a plot of an example of operating temperature determination for a furnace performing combustion of sulfur vapor to generate hydrogen gas.

FIG. 4 is a plot of an example of operating temperature determination for the furnace performing combustion of S vapor to generate $H_2$. $R^2$ is 1 because a straight line and with the data points as calculated values from the NIST data. While the common area above the two lines is grayed, the intersection of the two lines is significant as representing (determining) the beneficial or optimum temperature. The plot in this implementation indicates a beneficial or optimum operating temperature of 1506° K. The furnace operating temperature may be specified, for example, in the range of 1075° K to 1881° K. Thus, FIG. 4 shows a beneficial or optimum temperature at 1506° K in an operational temperature range of 802° C. (1075° K) to 1608° C. (1881° K).

FIG. 5 depicts the overall reaction in the furnace to generate $H_2$ (and $SO_2$). This overall reaction shows that water and sulfur vapor are consumed.

Figure 6:
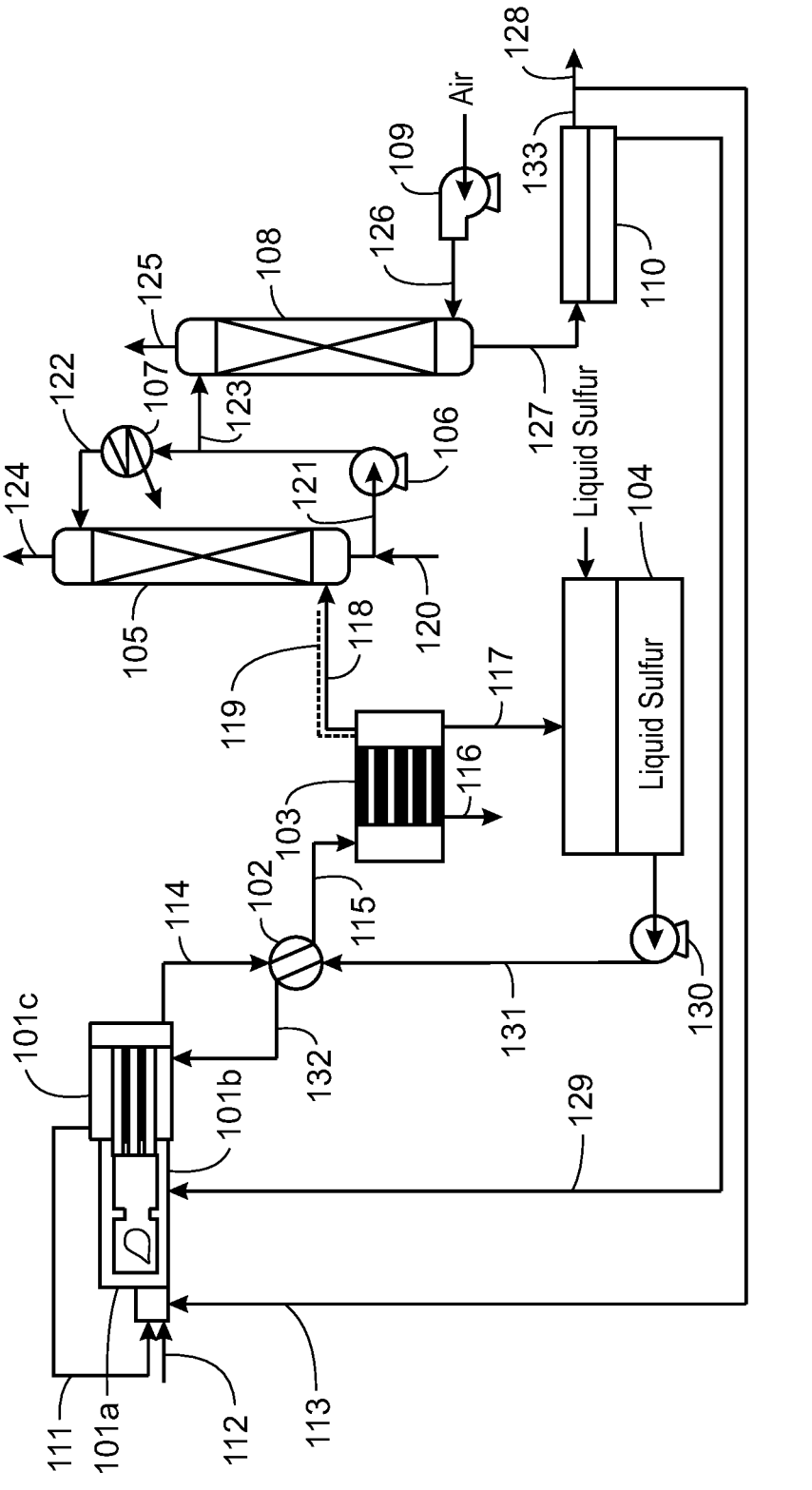
FIG. 6 is a diagram of a hydrogen production system that produces hydrogen gas as product and additionally may produce sulfuric acid as a co-product.

FIG. 6 is a hydrogen production system 100 that produces hydrogen gas as product and additionally may produce sulfuric acid (e.g., in stream 128) as a co-product. The produced hydrogen gas (e.g., in stream 124) may be utilized as product or further processed to be utilized as product.

The hydrogen production system 100 has a furnace (vessel) to combust elemental sulfur vapor to generate hydrogen gas. The furnace may be labeled as a sulfur burner, and can be a Claus-type furnace with sulfur instead of acid gas fed to the furnace. The furnace vessel may have a combustion chamber having a first zone 101a and a second zone 101b separated by an internal baffle in the combustion chamber. The furnace may operate at a temperature, for example, in the range of 802° C. (1075° K) to 1608° C. (1881° K). The furnace vessel may include a heat exchanger part 101c that can be labeled as a boiler or waste heat boiler (WHB) to cool furnace gas (and recover heat from the furnace gas). The configuration of the furnace may be the same or similar as a Claus furnace. The furnace may be labeled as a reaction furnace, Claus-type furnace, or sulfur burner. In general, acid gas or $H_2S$ is not fed to the furnace. While the hydrogen production system 100 can be situated in a sulfur recovery plant, the system 100 is generally not an SRU or Claus system, and elemental sulfur is generally not generated. Again, however, the furnace 101a/101b (and 101c) may be the same or similar as a typical Claus furnace but with elemental sulfur vapor fed instead of acid gas or $H_2S$.

In operation, elemental sulfur vapor 111 and oxygen gas ($O_2$) 112 are fed to the furnace for combustion in the first zone 101a. In the furnace, the sulfur vapor 111 is partially burned (partial combustion, partial oxidation) with a sub-stoichiometric amount of oxygen gas ($O_2$) 112 in at least the first zone 101a. The partial combustion of sulfur vapor may be defined herein as $O_2+2S_{Vap}{\rightarrow}2SO$ with a sub-stoichiometric amount of $O_2$ relative to the S vapor.

Sulfuric acid 113 may be fed to the furnace for the combustion in the first zone 101a. The sulfuric acid 113 may be recycled sulfuric acid, as discussed below. The sulfuric acid 113 fed to the furnace may be a relatively small amount compared to the amount of sulfur vapor 111 fed to the furnace.

In implementations, an inlet part of the furnace mixes streams 111, 112, 113 (e.g., in a nozzle) to ignite the mixture into the furnace flame for combustion in the first section 101a of the furnace combustion chamber.

In the first zone 101a, the reaction for the partial combustion (partial oxidation) of the elemental sulfur vapor 111, as mentioned and as indicated in FIG. 1, may be $O_2+2S{\rightarrow}2SO$. The furnace gas (combustion gas) having the generated SO flows from the first zone 101a to the second zone 101b.

Water 129 may be injected into the second zone 101b of the furnace for the water-gas shift reaction of the SO to generate the desired hydrogen gas. The SO water-gas shift reaction is $H_2O+SO{\rightarrow}H_2+SO_2$. The water-gas shift reaction of SO may be similar (at least in principle) to the water-gas shift reaction of carbon monoxide (CO).

The SO water-gas shift reaction gives the hydrogen gas to be provided as product by the hydrogen production system 100. The reaction of the SO water-gas shift (and the reverse disproportionation of SO) occurs at a temperature ranging between 802° C. and 1608° C. The operating temperature of the furnace (including the first zone 101a and/or the second zone 101b) may be specified as a temperature in that range. This operating temperature for the first zone 101a or the second zone 101b, or both, may be, for example, 1100° C. to 1350° C., 1150° C. to 1300° C., or 1180° C. to 1280° C., such as at about 1233° C.

The overall reaction in the furnace (sulfur burner) involving the partial combustion (partial oxidation) of sulfur vapor in the first zone 101a and the water-gas shift reaction of the SO in the second zone 101b may be characterized as $2H_2O+O_2+2S{\rightarrow}2H_2+2SO_2$. See FIG. 5.

The furnace gas (combustion gas, reaction gas) (having the generated hydrogen gas) from the second zone 101b of the furnace (e.g., a Claus-type furnace or sulfur burner) flows through and is cooled in the heat exchanger part 101c of the furnace. The furnace gas cooled in the heat exchanger part 101c may discharge from the furnace (e.g., from the heat exchanger part 101c) as furnace exhaust gas 114 at a temperature, for example, of less than 315° C. The furnace exhaust gas 114 has the hydrogen gas generated in the second zone 101b via the water-gas shift reaction of the SO. The furnace exhaust gas 114 may have $H_2$, $SO_2$, and unreacted S vapor.

The heat exchanger of the heat exchanger part 101c of the furnace may be a shell-and-tube heat exchanger. In implementations, the furnace vessel wall may be or act as the shell of the shell-and-tube heat exchanger. Heat transfer from the furnace gas to the cooling fluid may occur through the tube wall of each of the multiple tubes. In certain implementations, the furnace gas from the second zone 101b to be cooled flows through the tubes (tube side) of the heat exchanger, and the cooling medium flows outside of the tubes (shell side).

Liquid sulfur may be the cooling medium in the heat exchanger of the heat exchanger part 101c. The liquid sulfur (cooling medium) is on the opposite side of the heat exchanger with respect to the furnace gas. In cooling the furnace gas received from the second zone 101b, the heat exchanger part 101c may vaporize the liquid sulfur (cooling medium) with heat from the furnace gas (through the tube wall) to give the sulfur vapor 111 sent as feed to the furnace. As mentioned, the elemental sulfur vapor 111 may be fed for partial combustion of the sulfur vapor 111 in the first zone 101a to give the SO to be subjected to water-gas shift in the second zone 101b.

For provision of the cooling medium (liquid sulfur) to the heat exchanger part 101c, liquid sulfur 131 may be pumped from a vessel 104 (e.g., a sulfur pit) having liquid sulfur. The liquid sulfur 131 may be pumped via a pump 130 (e.g., centrifugal pump) from the vessel 104 through a heat exchanger 102 that heats the liquid sulfur 131 to give pre-heated liquid sulfur 132 (same composition as the liquid sulfur 131) provided to the heat exchanger part 101c. The heat exchanger 102 (e.g., shell-and-tube heat exchanger, plate-fin heat exchanger, etc.) may be a cross-exchanger that heats the liquid sulfur 131 with heat from the furnace exhaust gas 114 discharged from the heat exchanger part 101c. The heat exchanger 102 may be labeled as an econo-mizer in recovering heat from the furnace exhaust gas 114.

The furnace exhaust gas 114 discharges from the heat exchanger 102 as cooled furnace exhaust gas 115. The composition of the cooled furnace exhaust gas 115 is gen-erally the same as the furnace exhaust gas 114. Again, the furnace exhaust gas 114/115 may have $H_2$, $SO_2$, and unre-acted S vapor.

In heating the liquid sulfur 131 with heat from the furnace exhaust gas 114, the heat exchanger 102 cools the furnace exhaust gas 114 to discharge the cooled furnace exhaust gas 115. The cooled furnace exhaust gas 115 flows from the heat exchanger 102 to the condenser 103 heat exchanger.

The cooling medium (cooling fluid) flowing through the condenser 103 (e.g., shell-and-tube heat exchanger) may be water, such as demineralized water, steam condensate, or boiler feedwater. In cooling the furnace exhaust gas 115, the condenser 103 may vaporize the entering liquid water (cool-ing fluid) into steam 116, e.g., low pressure steam less than 150 pounds per square inch gauge (psig), discharged from the condenser 103.

The condenser 103 may cool (remove heat from) the furnace exhaust gas 115 to lower the temperature of the furnace exhaust gas 115 to condense elemental sulfur vapor in the furnace exhaust gas 115. The sulfur as condensed may discharge as liquid elemental sulfur 117 from the condenser 103 to the vessel 104 (a sulfur receiver), such as a sulfur pit.

A sulfur pit may be a sulfur receptacle, container, or vessel, and so on. The sulfur receiver or sulfur pit may be a storage vessel in which S that has been condensed is received, and accumulated and stored. A sulfur pit may temporarily accommodate elemental S extracted from an SRU or similar system and that may be conveyed for further processing or to transportation systems, and the like. As mentioned the liquid sulfur 131/132 that becomes the sulfur vapor 111 for combustion in the furnace may be from the vessel 104. Thus, the sulfur condensed in the furnace exhaust gas 115 as liquid sulfur 117 (sent to the vessel 104) may be pumped from the vessel 104 for combustion as vapor in the first zone 101a of the furnace. Liquid sulfur (other than liquid sulfur 117) may be added to the vessel 104. This additional liquid sulfur may account for the consumption of the sulfur vapor 111 in the furnace. In the case of the hydrogen production system 100 disposed at a sulfur recov-ery plant, one or more SRUs may discharge elemental liquid sulfur to the vessel 104. On the other hand, the additional liquid sulfur added to the vessel 104 can from another source.

The furnace exhaust gas 115 (minus the elemental sulfur 117) discharges from the condenser 103 as process gas 118. The temperature of the process gas 118 as discharged from the condenser 103 may be less than 165° C. and less than the temperature of the cooled furnace exhaust gas 115 that enters the condenser 103. The process gas 118 may include $H_2$ and $SO_2$ generated in the water-gas shift reaction of the SO in the second zone 101b of the furnace. The process gas 118 may include residual elemental sulfur, such as a rela-tively small amount of S vapor and/or entrained liquid S.

The process gas 118 may flow from the condenser 103 to the quench tower 105. Heat tracing 119 may be disposed along the conduit conveying the process gas 118 to the quench tower 105 to prevent or reduce sulfur deposition (from elemental S) in the process gas 118. The heat tracing 119 may be, for example, electrical tracing or steam tracing, that generates heat to maintain the temperature of the process gas 118 flowing through the conduit. Electrical tracing may an electrical heating element (electric trace heating cable) run in physical contact along the length of the conduit and that generates heat. Steam tracing may be a relatively small-diameter tubing in which steam is routed to heat the conduit to maintain the temperature of the process gas 118. The conduit may be covered with thermal insulation to retain heat losses from the conduit. The heat tracing 119 may be a component of a heat tracing system.

The process gas 118 enters the quench tower 105 (e.g., into a bottom portion of the quench tower 105) and flows upward through the quench tower 105 (e.g., a vertical vessel) in a countercurrent flow direct with aqueous sulfu-rous acid 122 flowing downward through the quench tower 105. The aqueous sulfurous acid 122 may be cooled in the cooler 107 (e.g., to 60° C.) and may be a relatively dilute sulfurous acid in water, and thus labeled as a cooled acidic water. In the quench tower 105, the contact of the gas 118 with the sulfurous acid 122 cools the gas, such as to 60° C. The quench tower 105 vessel may have, for example, packing or trays in the vessel to provide for increased contact of the gas (flowing upward in the tower 105) with the sulfurous acid 122 (flowing downward in the tower 105). The sulfurous acid 122 can be labeled as a quench medium. The residual elemental S in the process gas stream 118 may be transformed into soluble polythionic acid in presence of excess of sulfurous acid. Therefore, little or no sulfur solid may accumulate in the quench tower 105.

In the quench tower 105, the $H_2$ in the process gas may be separated from the $SO_2$ in the process gas 118 by absorbing the $SO_2$ into the sulfurous acid 122. $SO_2$ absorbed in water may form sulfurous acid.

The hydrogen gas 124 may discharge overhead from the quench tower 105. In implementations, the hydrogen gas 124 may be a product of the hydrogen production system 100. The hydrogen gas 124 can be utilized as product or can be processed to purify hydrogen gas as product.

In the quench tower 105, the sulfurous acid 122 may become more concentrated sulfurous acid with the absorp-tion of $SO_2$. However, the makeup water 120 added to the aqueous sulfurous acid 121 discharged from tower 105 may maintain the sulfurous acid as dilute. Aqueous sulfurous acid 121 may discharge (e.g., as a bottoms stream) from a bottom portion of the quench tower 105. Again, makeup water 120 may be added to the sulfurous acid 121 (e.g., to account for the water in the portion 123 of the sulfurous acid 121 sent to the oxidation tower 108). The sulfurous acid 121 may be sent via a pump 106 through a cooler 107 heat exchanger (e.g., air cooler with ambient air as cooling medium) to an upper part of the quench tower 105. The cooler 107 may cool (reduce the temperature of) the sulfurous acid 121 (e.g., to a temperature less than 60° C.) to give the sulfurous acid 122 that enters the upper part of the quench tower 105 and flows downward in the quench tower 105. The composition of the sulfurous acid 121 as entering the cooler 107 may be the same as the composition of the sulfurous acid 122 dis-charged from the cooler.

A portion 123 of the aqueous sulfurous acid 121 (e.g., upstream of the cooler 107) may be sent to an oxidation tower 108 vessel (e.g., a column or vertical vessel). The portion 123 of the aqueous sulfurous acid 121 may be a representative portion of the sulfurous acid 121 in that the portion 123 has the same composition as the sulfurous acid 121 discharged from the pump 106. The portion 123 of the aqueous sulfurous acid 121 may enter at an upper part of the oxidation tower 108 and flow downward in the oxidation tower 108 in a countercurrent flow direction with respect to air 126 flowing upward through the oxidation tower 108. The air 126 may be introduced into a bottom part of the oxidation tower 108 via a blower 108 (e.g., centrifugal fan). In implementations, the blower 109 may receive ambient air to discharge at the air 126.

In the oxidation tower 108, the oxygen gas in the air 126 may oxidize the aqueous sulfurous acid ($H_2SO_3$) into sulfuric acid ($H_2SO_4$). The oxidation tower 108 vessel may have, for example, packing or trays in the tower to provide for increased contact of the air (flowing upward in the tower 108) with the sulfurous acid 123 flowing downward in the tower 108. The overhead gas 125 (e.g., air substantially depleted in oxygen) exiting overhead from the oxidation column 108 may generally be the air 126 minus the 02 gas from the air 126 utilized (consumed) in the oxidation of the $H_2SO_3$ into $H_2SO_4$. Thus, the overhead gas 125 may be $N_2$ gas with some $O_2$ gas (e.g., 2-4 vol % of $O_2$).

Aqueous sulfuric acid 127 may discharge (e.g., as a bottoms stream) from a bottom portion of the tower 108 and is sent through a membrane of a membrane system 110. The membrane system may include a vessel holding the membrane. The membrane may be a nanofiltration (NF) membrane, reverse osmosis (RO) membrane, etc., in an associated membrane system 110. The membrane treatment of acidic aqueous waste is well known in the mining industry. Polymeric membranes are applicable for the recovery of sulfuric acid. An example of applicable polymer membrane is TFC-HR (thin film composite polyamide membrane) of Koch Membrane Systems available from Koch Industries, Inc. having headquarters in Wichita, Kansas USA. Another example of an applicable polymer membrane is HYDRACoRe70pHT (sulfonated polyethersulfone membrane) from Hydranautics of Nitto Denko Corporation having headquarters in Osaka, Japan. Yet another example is Desal KH (piperazine-based polyamide membrane) available from Suez Waters USA Inc. having headquarters in Revose, Pennsylvania USA.

The membrane of the membrane system 110 discharges sulfuric acid 133 (e.g., more concentrated than the entering sulfuric acid 127) as retentate, and relatively pure or clean water 129 as permeate. A portion 128 of the sulfuric acid 133 (e.g., relatively concentrated) may be removed as product to be valorized. Another portion 113 of the sulfuric acid 133 may be provided (e.g., conveyed via a conduit) to the furnace to enrich the furnace (e.g., the first zone 101a) in oxygen, in which aspects may be described in the U.S. Pat. No. 4,826,670, US Published Patent Application No. 2022/0177306A1, and US Published Patent Application No. 2022/0199908A1, all three of which are incorporated by reference herein in their entirety. The portions 113, 128 may have the same composition (the same concentration of sulfuric acid in water).

Conventional techniques for producing $H_2$ generate carbon dioxide $CO_2$ (such as in hydrocarbon steam reforming), or are slow and yield relatively small quantity of $H_2$ (such as in water electrolysis).

In present embodiments, a novel set of reactions (partial combustion of S vapor and the water-gas shift of SO) are employed in a furnace to produce hydrogen and sulfur dioxide. The hydrogen may be isolated from furnace exhaust gas as product. The sulfur dioxide can be transformed downstream into sulfuric acid. The sulfuric acid as an additional product can be monetized and/or sent to the furnace to enrich the furnace (e.g., Claus-type furnace) in oxygen. Thus, the techniques may address $H_2$ production from the partial combustion of S vapor and the water-gas shift of SO, resulting in achievement of hydrogen and sulfuric acid production from sulfur. The production of intermediate SO is from the partial combustion of sulfur vapor, which is not readily available for combustion of sulfur liquid or hydrogen sulfide.

The process to produce $H_2$ and sulfuric acid can be implemented at a site having an existing SRU (and/or SRU tail gas treatment). Starting material of elemental sulfur may be available from the SRU. Again, the sulfuric acid can be monetized and/or utilized enrich the furnace in oxygen.

FIG. 7 is a method 700 of producing hydrogen gas. The method may additionally include producing sulfuric acid as co-product. In implementations, the method may be for the co-production of hydrogen gas and sulfuric acid.

At block 702, the method includes converting sulfur vapor and oxygen gas in a first zone of furnace into sulfur monoxide. The first zone may be an initial zone of a combustion chamber of the furnace vessel. The sulfur vapor and the oxygen gas may be fed to the first zone, such as from external of the furnace. The sulfur vapor and oxygen gas can be fed separately, and mixed (e.g., via a nozzle) in an initial part of the furnace and introduced (and ignited) into the first zone for the partial combustion of the sulfur vapor. The converting of the sulfur vapor and oxygen gas in the first zone into sulfur monoxide may be by the partial combustion of the sulfur vapor. The partial combustion of sulfur vapor may be defined as the conversion of sulfur vapor and oxygen gas into SO, and with a sub-stoichiometric amount of oxygen gas relative to the sulfur vapor for the combustion.

At block 704, the method includes converting the sulfur monoxide and water in a second zone of the furnace into hydrogen gas and sulfur dioxide. The SO may flow from the first zone to the second zone. The method may include injecting the water into the second zone. The water may be injected into the second zone from external of the furnace. The converting of the SO and water in the second zone into $H_2$ and $SO_2$ may be a water-gas shift reaction of the SO. The hydrogen gas generated may be recovered downstream as product. The generated $SO_2$ may be utilized downstream to form sulfuric acid as product.

At block 706, the method may include cooling furnace gas in a heat exchanger part (e.g., 101c of FIG. 6) of the furnace after the second zone. The method includes discharging furnace exhaust gas from the furnace, the furnace exhaust gas include hydrogen gas and sulfur dioxide generated in the second zone of the furnace.

The method may include providing liquid sulfur from a vessel (e.g., the vessel in block 708) as a cooling fluid to the heat exchanger part. Thus, the method may include cooling furnace gas from the second zone in the heat exchanger part of the furnace with liquid sulfur as cooling medium. The cooling of the furnace gas via the heat exchanger part vaporizes the liquid sulfur into the sulfur vapor that is fed to the first zone. Thus, the method may include vaporizing the liquid sulfur in the heat exchanger part into sulfur vapor provided to the first zone.

The providing of the liquid sulfur may involve pumping (via a pump) the liquid sulfur from the vessel. The providing of the liquid sulfur may involve flowing the liquid sulfur from the vessel through a cross-exchanger (a heat exchanger) external to the furnace to the heat exchanger part of the furnace and heating the liquid sulfur in the cross-exchanger with heat from the furnace exhaust gas, wherein discharging the furnace exhaust gas from the furnace includes discharging the furnace exhaust gas from the furnace through the cross-exchanger to the condenser.

At block 708, the method includes condensing elemental sulfur vapor in the furnace exhaust gas into elemental liquid sulfur in a condenser. The condenser is a heat exchanger downstream of the furnace. The method includes discharging the liquid sulfur from the condenser to a vessel (e.g., a sulfur pit) and discharging a process gas from the condenser to a quench tower. The process gas includes the hydrogen gas and the sulfur dioxide from the furnace exhaust gas. The process gas may be the furnace exhaust gas minus the condensed S vapor discharged as liquid sulfur from the condenser.

At block 710, the method includes absorbing the sulfur dioxide from the process gas into sulfurous acid in the quench tower and discharging from the quench tower the hydrogen gas from the process gas. In implementations, the hydrogen gas may be discharged from the quench tower as product. The hydrogen gas may be discharged overhead from the quench tower.

The method may include discharging the sulfurous acid (aqueous sulfurous acid) from the quench tower. The method may include recycling a portion of the discharged sulfurous acid as quench medium to the quench tower and providing another portion of the discharged sulfurous acid to an oxidation tower.

At block 712, the method may include oxidizing the sulfurous acid (in the oxidation tower) into sulfuric acid with oxygen from air injected into the oxidation tower. The method may include discharging a bottoms stream having sulfuric acid from a bottom portion of the oxidation tower through a membrane system including a membrane. The method may include discharging water from the membrane as permeate, and discharging sulfuric acid from the membrane as retentate, wherein the sulfuric acid concentration of the retentate is greater than the sulfuric acid concentration of the bottoms stream. In implementations, the injecting (block 704) of water into the second zone of the furnace may include injecting the water discharged from the membrane as permeate into the second zone. The method may include providing at least a portion of the retentate to the furnace for combustion in the first zone of the furnace, or providing at least a portion of the retentate as sulfuric acid product (e.g., discharged from the hydrogen production system), or a combination thereof. The method may include providing at least a portion of the retentate as sulfuric acid product discharged from the hydrogen production system.

An embodiment is a method of producing hydrogen, including converting sulfur vapor and oxygen gas in a first zone of furnace into sulfur monoxide, injecting water into a second zone of the furnace, converting the sulfur monoxide and the water in the second zone into hydrogen gas and sulfur dioxide, and discharging furnace exhaust gas from the furnace, the furnace exhaust gas including the hydrogen gas and the sulfur dioxide. The converting of sulfur vapor and oxygen gas in the first zone into sulfur monoxide may be or involve partial combustion of the sulfur vapor. The converting of the sulfur monoxide and water in the second zone into hydrogen gas and sulfur dioxide may be or involve a water-gas shift reaction of the sulfur monoxide. The operating temperature of the first zone or the second zone, or both, may be in the range of 802° C. to 1608° C., or may be, for example, in the range of 1100° C. to 1350° C.

The method includes condensing sulfur vapor in the furnace exhaust gas into liquid sulfur in a condenser (heat exchanger) downstream of the furnace, discharging the liquid sulfur from the condenser to a vessel, and discharging a process gas from the condenser to a quench tower, the process gas including the hydrogen gas and the sulfur dioxide. The method includes absorbing the sulfur dioxide from the process gas into sulfurous acid in the quench tower, and discharging from the quench tower the hydrogen gas from the process gas.

The method may include cooling furnace gas in the furnace in a heat exchanger part of the furnace after the second zone, and providing the liquid sulfur from the vessel as a cooling fluid to the heat exchanger part, wherein cooling the furnace gas via the heat exchanger part vaporizes the liquid sulfur into the sulfur vapor that is fed to the first zone. If so, the providing of the liquid sulfur may involve flowing the liquid sulfur from the vessel through a cross-exchanger external to the furnace to the heat exchanger part of the furnace and heating the liquid sulfur in the cross-exchanger with heat from the furnace exhaust gas, and wherein discharging the furnace exhaust gas from the furnace includes discharging the furnace exhaust gas from the furnace through the cross-exchanger to the condenser.

The method may include discharging the sulfurous acid from the quench tower (the sulfurous acid being aqueous sulfurous acid), providing a portion of the sulfurous acid discharged from the quench tower to an oxidation tower, and oxidizing the sulfurous acid into sulfuric acid in the oxidation tower with oxygen from air injected into the oxidation tower. If so, the method may include discharging a bottoms stream comprising sulfuric acid from the oxidation tower through a membrane system comprising a membrane, discharging water from the membrane as permeate, and discharging sulfuric acid from the membrane as retentate, wherein the retentate has a greater concentration of sulfuric acid than the bottoms stream. The injecting of the water into the second zone of the furnace may involve injecting the water discharged from the membrane as permeate into the second zone.

Another embodiment is a method of producing hydrogen, including converting sulfur vapor and oxygen gas in a first zone of furnace into sulfur monoxide, converting the sulfur monoxide and water in a second zone of the furnace into hydrogen gas and sulfur dioxide, wherein the water is injected into the second zone. The method includes cooling furnace gas from the second zone in a heat exchanger part of the furnace with liquid sulfur as cooling medium, vaporizing the liquid sulfur in the heat exchanger part into sulfur vapor provided to the first zone, and discharging furnace exhaust gas from the furnace, the furnace exhaust gas including the hydrogen gas and the sulfur dioxide. The method includes condensing sulfur vapor in the furnace exhaust gas into liquid sulfur in a condenser (heat exchanger) downstream of the furnace, and discharging the liquid sulfur from the condenser to a vessel.

The method may include discharging a process gas from the condenser to a quench tower (the process gas including the hydrogen gas and the sulfur dioxide), absorbing the sulfur dioxide from the process gas into sulfurous acid (aqueous sulfurous acid) in the quench tower, the sulfurous acid comprising, and discharging the hydrogen gas as product from the quench tower. The method may include oxidizing sulfurous acid (from the quench tower) with air in an oxidation tower into sulfuric acid, and discharging a bottoms stream comprising the sulfuric acid from the oxidation tower through a membrane system comprising a membrane. The method may include discharging water from the membrane as permeate, discharging sulfuric acid from the membrane as retentate, wherein the retentate has a greater concentration of sulfuric acid than the bottoms stream, and providing at least a portion of the retentate as sulfuric acid product discharged from the hydrogen production system.

Yet another embodiment is a hydrogen production system including a furnace to convert sulfur vapor and oxygen gas in a first zone of the furnace into sulfur monoxide, receive water as injected into a second zone of the furnace, and convert the sulfur monoxide and the water in the second zone into hydrogen gas and sulfur dioxide. The conversion of sulfur vapor and oxygen gas in the first zone into sulfur monoxide may be or involve partial combustion of the sulfur vapor. The conversion of the sulfur monoxide and the water in the second zone into hydrogen gas and sulfur dioxide may be or involve a water-gas shift reaction of the sulfur monoxide. The hydrogen production system includes a condenser heat exchanger to receive furnace exhaust gas from the furnace, condense sulfur vapor in the furnace exhaust gas into liquid sulfur and discharge the liquid sulfur to a vessel, and discharge a process gas having hydrogen gas and sulfur dioxide to a quench tower. The hydrogen production system includes the quench tower to absorb sulfur dioxide from the process gas into sulfurous acid and discharge hydrogen gas.

The furnace may have a heat exchanger part of the furnace after the second zone to cool furnace gas in the furnace and vaporize liquid sulfur as cooling medium into the sulfur vapor provided to the first zone, wherein the heat exchanger part is configured to receive the liquid sulfur from the vessel. The hydrogen production system may include a cross-exchanger to heat the liquid sulfur from the vessel with the furnace exhaust gas discharged from the furnace.

The hydrogen production system may an oxidation tower to receive sulfurous acid discharged from the quench tower, oxidize the sulfurous acid with air into sulfuric acid, and discharge a bottoms stream comprising the sulfuric acid. The hydrogen production system may include a membrane system having a membrane to receive the bottoms stream, discharge water from the membrane as permeate, and discharge sulfuric acid from the membrane as retentate, wherein the retentate comprises a greater concentration of sulfuric acid than the bottoms stream. The water injected into the second zone of the furnace may be or include the water discharged from the membrane as permeate. The membrane is configured may be configured to discharge at least a portion of the retentate to the furnace for combustion in the first zone, or discharge at least a portion of the retentate as sulfuric acid product, or a combination thereof.

A number of implementations have been described. Nevertheless, it will be understood that various modifications may be made without departing from the spirit and scope of the disclosure.

What is claimed is:

1. A method of producing hydrogen, comprising:

converting sulfur vapor and oxygen gas in a first zone of furnace into sulfur monoxide;

injecting water into a second zone of the furnace;

converting the sulfur monoxide and the water in the second zone into hydrogen gas and sulfur dioxide;

discharging furnace exhaust gas from the furnace, the furnace exhaust gas comprising unreacted sulfur vapor, the hydrogen gas and the sulfur dioxide;

condensing the unreacted sulfur vapor in the furnace exhaust gas into liquid sulfur in a condenser downstream of the furnace, the condenser comprising a heat exchanger;

discharging the liquid sulfur from the condenser to a vessel;

discharging a process gas from the condenser to a quench tower, the process gas comprising the hydrogen gas and the sulfur dioxide;

absorbing the sulfur dioxide from the process gas into sulfurous acid in the quench tower; and discharging from the quench tower the hydrogen gas from the process gas, wherein converting sulfur vapor and oxygen gas in the first zone into sulfur monoxide comprises partial combustion of the sulfur vapor, wherein converting the sulfur monoxide and water in the second zone into hydrogen gas and sulfur dioxide comprises a water-gas shift reaction of the sulfur monoxide, and wherein operating temperature of the first zone or the second zone, or both, is in the range of 802° C. to 1608° C.

2. The method of claim 1, comprising:

cooling furnace gas in the furnace in a heat exchanger part of the furnace after the second zone; and providing the liquid sulfur from the vessel as a cooling fluid to the heat exchanger part, wherein cooling the furnace gas via the heat exchanger part vaporizes the liquid sulfur into the sulfur vapor that is fed to the first zone.

3. The method of claim 2, wherein providing the liquid sulfur comprises flowing the liquid sulfur from the vessel through a cross-exchanger external to the furnace to the heat exchanger part of the furnace and heating the liquid sulfur in the cross-exchanger with heat from the furnace exhaust gas, and wherein discharging the furnace exhaust gas from the furnace comprises discharging the furnace exhaust gas from the furnace through the cross-exchanger to the condenser.

4. The method of claim 1, comprising:

discharging the sulfurous acid from the quench tower, the sulfurous acid comprising aqueous sulfurous acid;

providing a portion of the sulfurous acid discharged from the quench tower to an oxidation tower; and, oxidizing the sulfurous acid into sulfuric acid in the oxidation tower with oxygen from air injected into the oxidation tower.

5. The method of claim 4, comprising:

discharging a bottoms stream comprising sulfuric acid from the oxidation tower through a membrane system comprising a membrane;

discharging water from the membrane as permeate; and discharging sulfuric acid from the membrane as retentate, wherein the retentate comprises a greater concentration of sulfuric acid than the bottoms stream.

6. The method of claim 5, wherein injecting water into the second zone of the furnace comprises injecting the water discharged from the membrane as permeate into the second zone, wherein operating temperature of the first zone or the second zone, or both, is in the range of 1100° C. to 1350° C.

7. The method of claim 5, comprising providing at least a portion of the retentate to the furnace for combustion in the first zone, or providing at least a portion of the retentate as sulfuric acid product, or a combination thereof.

* * * * *